United States Patent [19]
Strätz et al.

[11] Patent Number: 5,704,337
[45] Date of Patent: Jan. 6, 1998

[54] FUEL TANK

[75] Inventors: Peter Strätz, Sindelfingen; Karl-Heinz Kempka, Esslingen, both of Germany

[73] Assignee: M C Micro Compact Car Aktiengesellschaft, Biel, Switzerland

[21] Appl. No.: 674,429

[22] Filed: Jul. 2, 1996

[30] Foreign Application Priority Data

Jul. 4, 1995 [DE] Germany .................. 195 24 254.8

[51] Int. Cl.⁶ .................................................. F02M 33/02
[52] U.S. Cl. .................. 123/519; 220/86.2; 123/516
[58] Field of Search ................... 123/509, 520, 123/519, 518, 516; 220/86.2

[56] References Cited

U.S. PATENT DOCUMENTS

| | | | |
|---|---|---|---|
| 2,154,072 | 4/1939 | Kamrath | 220/86.2 |
| 3,748,829 | 7/1973 | Joyce | 220/86.2 |
| 4,338,206 | 7/1982 | Mizuno | 123/519 |
| 4,572,394 | 2/1986 | Tanahashi et al. | |
| 4,701,198 | 10/1987 | Uranashi | 220/86.2 |
| 4,714,171 | 12/1987 | Sasaki | 220/86.2 |
| 4,741,369 | 5/1988 | Dawson | 220/86.2 |
| 4,750,465 | 6/1988 | Rediker | 123/519 |
| 4,891,000 | 1/1990 | Ishii | 220/86.2 |
| 4,919,103 | 4/1990 | Ishiguro | 123/519 |
| 5,183,170 | 2/1993 | Stege | 220/86.2 |
| 5,282,497 | 2/1994 | Alison | |
| 5,431,143 | 7/1995 | Brown | 123/509 |

FOREIGN PATENT DOCUMENTS

| | | | |
|---|---|---|---|
| 0 604 320 | 6/1994 | European Pat. Off. | |
| 1 353 640 | 5/1974 | Sweden | |
| 1316161 | 5/1973 | United Kingdom | 123/519 |
| 2 257 694 | 1/1993 | United Kingdom | |

OTHER PUBLICATIONS

Jap. Abst. 60-199734 of Sep. 10, 1985.

*Primary Examiner*—Carl S. Miller
*Attorney, Agent, or Firm*—Klaus J. Bach

[57] ABSTRACT

In a fuel tank with a filler neck of plastic material which filler neck is connected at one end to the fuel tank and has a filler opening at its other end, a vent pipe extending from the tank to the filler opening, an adsorber chamber with a chamber opening and a fuel vapor conduit providing for communication of the tank with the adsorber chamber are all integrally formed with the filler neck in a single blow molding step, the adsorber chamber, after being filled with a bag of activated carbon, being closed by a lid which carries a regeneration valve and covers the chamber opening.

8 Claims, 1 Drawing Sheet

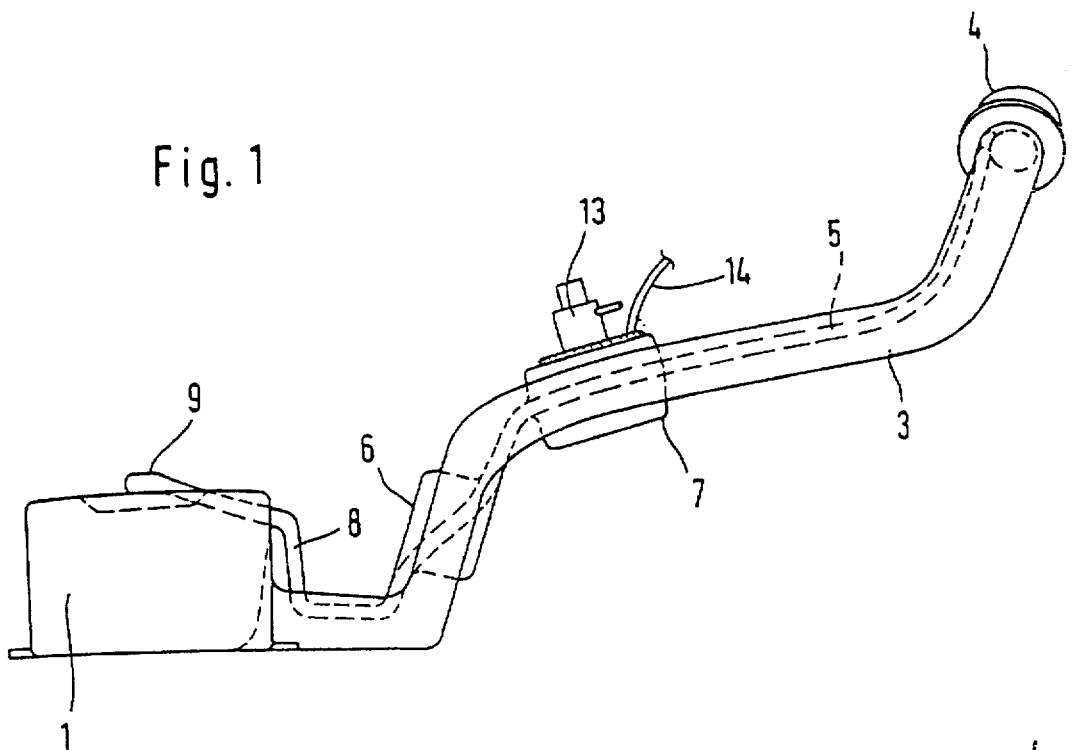
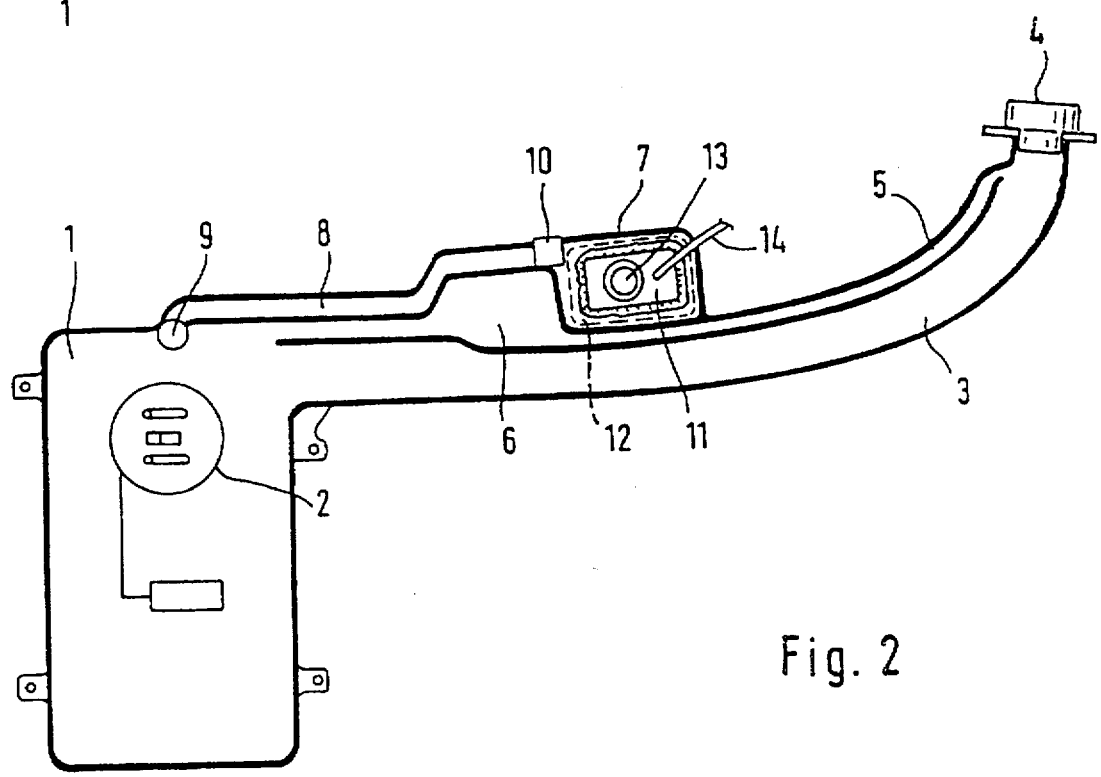

FUEL TANK

BACKGROUND OF THE INVENTION

The invention relates to a fuel tank, especially for motor vehicles with a filler neck of plastic and a chamber for the reception of activated carbon which is in communication with the tank by way of a fuel vapor conduit extending from the top of the tank.

It is a requirement in many countries to prevent the discharge of fuel vapors when fuel is filled into the fuel tank. For this purpose, a chamber with activated carbon is provided to which essentially all the fuel vapors are supplied by way of the fuel vapor conduit so that the fuel vapors are almost all absorbed.

U.S. Pat. No. 4,572,394 for example discloses a fuel tank of the type referred to above wherein the chamber with activated carbon is arranged at the inlet opening of the fuel filler neck and the wall of the filler neck near the inlet opening includes a valve which can be controlled by the filler neck cap and by the fuel nozzle used for filling the tank. The arrangement is such that the fuel vapor conduit is placed into communication with the interior of the chamber receiving the activated carbon whenever the fuel filler neck cap is removed or when the fuel nozzle, which is placed into the fuel neck during refueling, is removed from the filler neck.

The activated carbon chamber also includes separate connections for a regeneration line, by which, under certain operating conditions of the motor vehicle, communication is established between the chamber and the engine intake manifold in order to desorb and burn the vapors adsorbed by the activated carbon.

It is the object of the present invention to provide an activated carbon chamber of the type described above in an arrangement which provides for an advantageous design.

SUMMARY OF THE INVENTION

In a fuel tank with a filler neck of plastic material which filler neck is connected at one end to the fuel tank and has a filler opening at its other end, a vent pipe extending from the tank to the filler opening, an adsorber chamber with a chamber opening and a fuel vapor conduit providing for communication of the tank with the adsorber chamber are all integrally formed with the filler neck in a single blow molding step, the adsorber chamber, after being filled with a bag of activated carbon, being closed by a lid which carries a regeneration valve and which covers the chamber opening.

The invention is particularly concerned with a simplification for placing the appropriate amount of activated carbon into the adsorber chamber by containing a certain required amount of activated carbon in a bag which, on one hand, substantially facilitates the insertion of the activated carbon into chamber provided therefor, and, on the other hand, safely retains the activated carbon within the chamber without the need for additional retaining means. After insertion of the activated carbon bag into the respective chamber, the chamber only has to be closed by a lid. In accordance with the invention, the lid serves at the same time, as mounting means for the regeneration valve which, for that purpose, is arranged on the lid.

In accordance with a preferred embodiment of the invention, the activated carbon chamber is formed integrally with the tank or with the filler neck. Furthermore, a vent pipe may be integrally formed with the filler neck which extends separately from the fuel vapor conduit from the fuel tank to the inlet opening of the filler neck.

If, in accordance with a particularly preferred embodiment of the invention, the filler neck, the activated carbon chamber and the fuel tank all consist of plastic material the filler neck can be made together with the activated carbon chamber and the fuel vapor conduit as a practically complete component in a single blow molding step. Subsequently, only the activated carbon bag needs to be inserted and the lid for closing the activated carbon chamber has to be installed.

Preferred features of the invention will be described below in greater detail on the basis of the accompanying drawings.

BRIEF DESCRIPTION OF THE DRAWINGS

FIG. 1 is a somewhat schematic side view of a fuel tank according to the invention, and FIG. 2 is a top view of the fuel tank.

DESCRIPTION OF A PREFERRED EMBODIMENT

A fuel tank 1, which includes, in its interior, a fuel pump 2 with a fuel level sensor and a fuel filter, and, in the area of the suction connection of the fuel pump 2, a splash wall structure, is connected to a filler neck 3. The fuel tank and the filler neck, both consist of plastic. The filler neck is joined to the fuel tank at the bottom of the fuel tank 1 and has a fueling opening which is disposed above the level of the tank 1 and which can be closed by a lockable fuel cap.

The filler neck 3 has formed integrally therewith a vent pipe 5 which extends from an upper area of the fuel tank 1 to a point adjacent the fill opening of the filler neck 3. The vent pipe 5 has the shape of a siphon with a U-shaped section which extends downwardly from the tank top surface as shown in FIG. 1 and from the bottom of which the vent pipe rises toward the tank 1 and toward the fill opening of the filler neck 3. In its path to the fill opening, the vent pipe includes a fuel retaining chamber 6 into which fuel overflows if the tank 1 is filled excessively so that the fuel enters the vent pipe 5. This prevents a fuel surge from splashing out of the fill opening of the filler neck 3 via the vent pipe 5 during refueling. In order to safely obtain this result, the fuel retaining chamber 6 is arranged at least partially at a higher level than the fuel tank 1.

In addition, the filler neck 3 has integrally formed therewith, a further chamber 7 which is in communication with the upper part of the tank 1 by way f a fuel vapor conduit 8. The fuel vapor conduit 8 is also formed integrally with the tank and extends along the filler neck next, and parallel, to the vent pipe 5.

At the connection of the fuel vapor conduit 8 to the tank 1, there is a fuel vapor valve 9 which is in the form of a float valve which will be closed by fuel splashing occasionally upwardly, whereby passage of fuel into the fuel vapor conduit 8 and, consequently, into the chamber 7 is prevented. At the jointure of the fuel vapor conduit 8 with the chamber 7, there is a two-way valve 10 by which the chamber 7 can be closed toward the tank 1.

The chamber 7 is provided with a relatively large opening which is sealed by a lid 11. Upon removal of the lid 11, a bag 12 with activated carbon can be deposited through the opening into the chamber 7 where it is safely retained. After the bag 12 is deposited in the chamber 7, the lid 11 may be firmly fixed to the chamber for example by welding. A regeneration valve 13 is mounted onto the lid 11 and a fresh air pipe is also connected thereto.

The whole filler neck 3 can be blow molded from plastic material together with the vent pipe 5 and the fuel retaining chamber 6 and also the fuel vapor conduit 8 and the adsorber chamber 7. Then the bag 12 with the activated carbon is placed into the adsorber chamber 7 through the opening which is then closed by welding the lid 11 onto the chamber. In this way, the regeneration valve 13 and the fresh air pipe 14 which are both premounted to the lid are mounted at the same time onto the chamber 7. The two-way valve 10 is mounted into an opening in the chamber 7 which, if not preformed during molding, is cut into the chamber wall. Also, the fuel vapor valve 9 is mounted into the fuel vapor conduit at the jointure of the fuel vapor conduit 8 with the tank 1.

Subsequently, the complete filler neck is welded onto the fuel tank 1 which may also be made in a single blow molding step from plastic material whereby the fuel tank 1 and filler neck 3 are fully assembled.

Unlike the arrangement as shown in the drawings, the chamber 7 for the bag 12 with activated carbon or a similar material may be formed as part of the fuel container 1 or it may be arranged more closely adjacent the fuel container 1. But also, in this case, the filler neck 3 and the chamber 7 are formed preferably together by blow molding so that an integral component comprising the filler neck 3 and the chamber 7 is provided. If suitable, also the fuel tank 1 may be included or the fuel tank may be blow-molded separately and then connected to the filler neck.

What is claimed is:

1. A method of making a fuel tank with a filler neck of plastic material wherein said filer neck is connected at one end to said tank and has a filler opening at its opposite end, a vent pipe extending from the tank to said filler opening, an adsorber cheer with an opening arranged adjacent said filler neck, a fuel vapor conduit extending between the top of said tank and said adsorber chamber and a lid for closing said chamber, said method comprising the steps of: blow molding said filler neck from a plastic material so as to form, integrally with said filler neck, said vent pipe, said fuel vapor conduit and said adsorber chamber, inserting a bag with activated carbon into said adsorber chamber and closing said adsorber chamber with said lid.

2. A method according to claim 1, wherein said lid is welded onto said adsorber chamber so as to close said opening.

3. A fuel tank, particularly for automotive vehicles, having a filler neck of a plastic material, an adsorber chamber receiving activated carbon and being in communication with said fuel tank, a fuel vapor conduit extending from a top area of said tank to said adsorber chamber, said adsorber chamber enclosing a bag including activated carbon and having an opening for inserting said bag, and a lid with a regenerating valve mounted thereon extending across, and closing, said opening so as to contain said bag with activated carbon in said adsorber chamber.

4. A fuel tank according to claim 3, wherein said adsorber chamber is integrally formed with said filler neck.

5. A fuel tank according to claim 3, wherein said adsorber cheer is integrally formed with said tank.

6. A fuel tank according to claim 3, wherein said fuel vapor conduit extends from said chamber to said fuel tank along said fuel neck and a vent pipe extends from said tank to said fuel neck filler opening and both said fuel vapor conduit and said vent pipe are formed integrally with said fuel filler neck.

7. A fuel tank according to claim 3, wherein a fuel pump and a fuel level sensor are disposed in said tank.

8. A fuel tank according to claim 3, wherein said fuel tank and said filler neck consist of plastic material.

\* \* \* \* \*